United States Patent [19]

Sheridon

[11] 4,111,538
[45] Sep. 5, 1978

[54] PROJECTION SYSTEM OF HIGH EFFICIENCY

[75] Inventor: Nicholas K. Sheridon, Saratoga, Calif.

[73] Assignee: Xerox Corporation, Stamford, Conn.

[21] Appl. No.: 661,225

[22] Filed: Feb. 25, 1976

[51] Int. Cl.² ............................................. G03B 21/00
[52] U.S. Cl. ..................................... 353/122; 353/99
[58] Field of Search .......... 350/96 WG, 96 B, 160 R, 350/160 LC, 160 P, 161 S, 161 P; 353/122, 121; 355/1, 67; 352/198, 203; 240/1 LP

[56] References Cited

U.S. PATENT DOCUMENTS

| | | | |
|---|---|---|---|
| 3,001,447 | 9/1961 | Ploke | 353/122 |
| 3,278,738 | 10/1966 | Clark | 240/1 LP |
| 3,437,804 | 4/1969 | Schaefer et al. | 353/98 |
| 3,485,550 | 12/1969 | Dehaller et al. | 350/161 S |
| 3,544,192 | 12/1970 | Goldstein | 350/96 B |
| 3,676,667 | 7/1972 | Malifaud | 240/41.35 R |
| 3,693,515 | 9/1972 | Baker | 350/96 T |
| 3,716,359 | 2/1973 | Sheridon | 350/3.5 |
| 3,756,688 | 9/1973 | Hudson et al. | 350/96 B |
| 3,962,702 | 6/1976 | Kriege | 350/96 B |

*Primary Examiner*—Harry N. Haroian
*Attorney, Agent, or Firm*—James J. Ralabate; Sheldon F. Raizes; Irving Keschner

[57] ABSTRACT

There is disclosed a light system for projection of images onto a visual read out surface such as a screen or photo receptor recording device such as a xerographic drum. The projection system employs a nonpoint light source which forms a light beam of nonuniform intensity. The light beam is passed through a conical light pipe with a high degree of internal reflection which diffuses the light beam, thereby reducing the nonuniformity of the light beam and also collimates the light beam by internal reflections. The collimated light beam is then modulated with imaging information and is focused onto a visual readout surface such as a screen or a recording device surface.

8 Claims, 10 Drawing Figures

PROJECTION SYSTEM OF HIGH EFFICIENCY

DESCRIPTION OF THE PRIOR ART

1. Field of the Invention

This invention relates to an image projecting system and, in particular, to an image projecting system having a very high light efficiency and particularly suitable for use with Ruticon imaging members.

2. Brief Statement of the Prior Art

Image projecting systems currently in use have very poor light efficiencies and require the use of a powerful light source so that the collected fraction of the generated light has sufficient intensity to permit it to be modulated with image information, commonly stored on an opaque or transparent member, and focused on a distal display screen or photo receptive surface.

There have recently been developed solid-state cyclic imaging members referred to as Ruticons. A Ruticon is a surface relief imaging member formed with successive layers of substrate, electrical conductor, photoconductor and elastomer. Ruticons which rely on reflected light readout systems also have a layer of a reflective material overlying the elastomer layer. The Ruticon is exposed to image information in the form of electromagnetic radiation and responds to such information by surface deformation of the elastomer layer in proportion to the radiation intensity. Light transmitted through the Ruticon is modulated by the varied thickness of the deformed layer or light is reflected and diffracted by the reflective layer which overlies the deformed elastomer layer. The modulated light can be used in an image projection system.

The Ruticon image projecting system does not have a desirably high light efficiency and it is, therefore, necessary to provide a very efficient light source to insure that an image projecting light beam of sufficient intensity is generated for modulation by the Ruticon imaging member. Additionally, the prior Ruticon readout schemes require nearly point sources of light such as expensive arc lamps. A quasi-Schlieren readout system has been suggested for use with Ruticon imaging members, however, this system has a low light efficiency. This system employs a louvered mirror assembly to pass approximately 30 percent of the incident light to the Ruticon. The projection facilities utilize only 70 percent of the modulated light reflected from the Ruticon thereby resulting in an overall light efficiency of only about 20 percent.

BRIEF DESCRIPTION OF THE INVENTION

This invention comprises light pipe means to effect diffusion and collimation of a light beam and an image projection system employing the light pipe means to achieve very high projection light efficiencies. The projection system can be employed with conventional transparency or opaque imaging members or with the solid state cyclic image recording devices commonly referred to as Ruticons.

BRIEF DESCRIPTION OF THE DRAWINGS

The invention is described with regard to the presently illustrated and preferred embodiments thereof illustrated in the drawings of which.

DETAILED DESCRIPTION OF THE INVENTION

Figure 1:
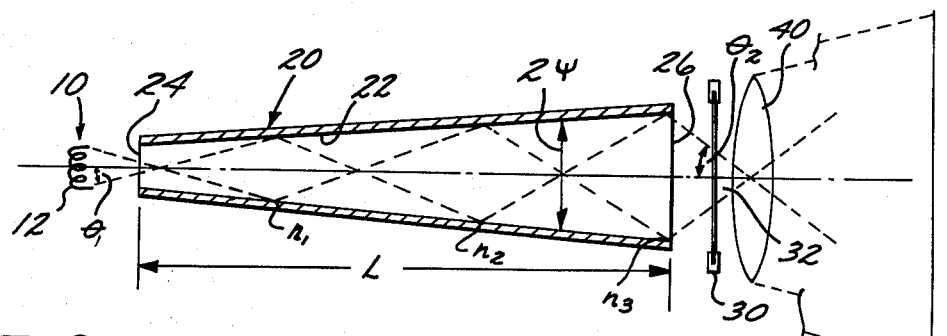
FIG. 1 illustrates the simplest application of the present invention.

Referring now to FIG. 1, the invention is illustrated in a projection system for imaged information obtained from a typical transparency. The projection system includes a nonpoint light source 10 such as a high resistant filament winding 12 of a projection lamp. Incident light from the source 10 is characterized by a nonuniform intensity. Placed in proximity to the light source 10 is a conical light pipe member 20 having internal walls 22 with a high degree of internal reflection such that substantially all of the light falling on aperture 24 is transmitted through light pipe 20 by internal reflections. The incident light enters aperture 24 of the light pipe 20 at an incident angle $\theta_1$ to the axis of transmission and undergoes a plurality of internal reflections, $n_1$, $n_2$, $n_3$, . . . With each internal reflection of the light, the light beam becomes more and more homogenous, i.e., the greater the number of internal reflections, the greater is the diffusion of the light beam and, hence, the lesser is the nonuniform intensity of the beam. The internal reflection of the light beam in the conical pipe also increases the collimation of the beam such that the beam exits from the light pipe 20 at an angle $\theta_2$ which is considerably less than its incident angle $\theta_1$.

The beam of light which has become more homogenous and more collimated during its transit through light pipe 20 is discharged against an imaging member 30 which can be a film transparency on which is recorded electromagnetic radiation information in the form of a developed photographic film and the like. The beam of light is thereby modulated by its transit through the transparency such that a modulated beam of light 32 is formed bearing radiant energy image information. This modulated beam of light 32 is passed through a conventional projection lens 40 for focusing onto a suitable display means 50 which can be a reflective screen to permit the visual display of the imaged information.

As previously mentioned, a conical light pipe 20 alters the homogeneity and collimation of the light beam received from the nonpoint light source 10. These effects are achieved as a result of the number of internal reflections of the beam during its transit through the light pipe 20. The number of internal reflections is dependent upon the length of the conical light pipe 20 and inversely dependent upon the conical angle of the light pipe walls 22. The number of reflections can be mathematically expressed as follows:

$N = f(L, 1/\psi)$ $N$ = number of internal reflections, $n_1$, $n_2$, $n_3$, etc;

$L$ = the length of conical light pipe; and $\psi$ = the cone angle of light pipe 20.

The degree of diffusion of the light beam achieved by the light pipe means is a direct function of the cone length L, while the degree of collimation of the light beam is an indirect function of the cone angle $\psi$.

In a typical application the length of the conical light pipe will be fixed by the physical dimensions of the projection system and the parameter which can be varied by the optical designer for achieving the desired degree of diffusion and/or collimation of the light beam is the cone angle $\psi$. Typically, the cone angle can be varied from 1° to about 60°, preferably from 5° to about 30° to achieve a wide variety of results in diffusion and collimation of the light beam. There may be some applications in which pipe 20 is fixed by the geometry of the system, e.g., the dimensions of the transparency imaging member 30 and/or dimensions of the filament light source 12. In such instances, the length (L) of the light pipe 20 can be varied as necessary to achieve the desired degree of diffusion and collimation.

Light pipe 20 can be formed of a variety of optical materials to achieve the desired transmission of a light beam without substantial losses. The light pipe 20 can be a hollow, truncated conical member with walls 22 formed of light opaque material and internally coated with a highly reflective surface, e.g., a silvered or mirrored surface. Alternatively, the light pipe 20 could be formed with fiber optic technology whereby the member is defined by one or a plurality of optical fiber elements. The optical fiber elements are formed of highly transparent materials having smooth reflective surfaces such that light entering one end of each element is transmitted to the other end by repeated internal reflections. These elements have extremely high reflection efficiency, characteristic of total internal reflection, and are formed of clear glass or plastic having a high refractive index and surrounded by material of lower refractive index. Typically, the optical fiber elements are coated with a protective film such as polyvinyl chloride or an acrylic polymer. The light pipe 20 can be formed as a bundle of the small diameter elements thus described or, in a preferred embodiment, can be formed as a single, solid core member of glass or of the transparent plastic, with the light undergoing total internal reflection at the transparent material air interface. In this last configuration the light pipe may be protected from damage with a layer of a second transparent material which has a lower refractive index than the first material. Total internal reflection would then take place at this interface. The surface of this solid light pipe may also be provided with a highly reflective coating, such as a metal, to provide an interface reflector.

When optical fibers are employed, each of the fibers are preferably formed with the cone angle $\psi$ previously described. The fibers are commonly formed by extruding or drawing of the plastic material, e.g., glass or plastic. The velocity of the fibers drawn from the softened bundle of optical fibers controls the diameter of the element. Typically, during the drawing process in which the diameter of the fiber optic bundle is decreased, the heated region of the bundle is strongly tapered, with the diameter of one end being that of the drawn portion of the bundle and that of the other end being that of the undrawn portion of the bundle. This tapered region is suitable for purposes of this invention. The remainder of the optical fiber processing is that of conventional optical fiber manufacture with the normal exercise of care to insure that the surface 22 is formed relatively free of defects and surface imperfections, thereby insuring substantially complete internal reflection with little or no diffusion or losses.

Figure 2:
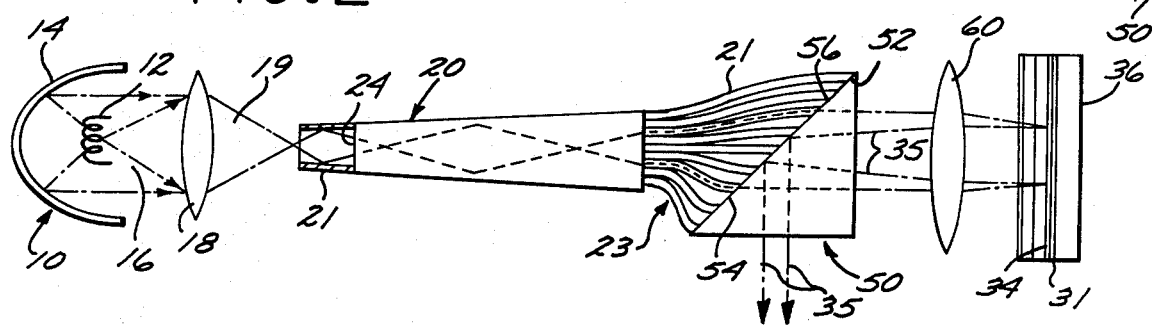
FIGS. 2 and 3 are elevation and plan views of an embodiment of the invention with a Ruticon imaging device.
Figure 3:
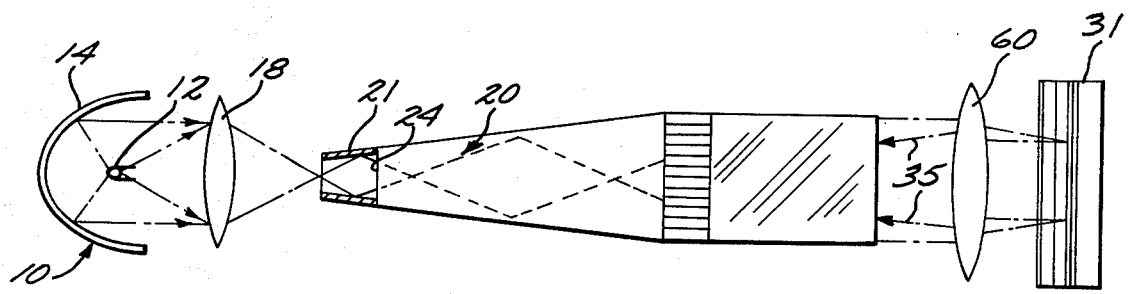

FIGS. 2 and 3 illustrate application of the invention to a reflective Ruticon imaging projection system. As there illustrated, the light source 10 includes a high resistant filament 12 of a projector lamp. The projector lamp includes an internal reflector 14 which is defined by a surface of revolution disposed in the lamp with the filament at its center of rotation such that reflector 14 collects substantially an entire hemisphere of light and focuses it into a light beam 16. Because the filament is not a single point light source and because of imperfections in reflector 14, light beam 16 is characterized by a substantial nonuniformity of light intensity.

Typical of suitable high efficiency projection lamps of the type that can be used in the invention include the Tru-Beam and Tru-Reflector projection lamps which are tungsten halogen lamps available from Sylvania. The lamp filaments commonly used are of tungsten wire formed into a coil or a ribbon filament. The lamps have a power rating of from 100 to about 800 watts and produce from 4 to about 36 lumens per watt as a function of their operating temperature. These lamps can include a halogen to reduce the internal deposition of tungsten, thereby permitting operation of the lamp for prolonged periods at higher temperatures and with a high specific lumen production.

The light beam 16 can be processed through a condensor lens system 18. Lens 18 can be plano-convex or double-convex and can be positioned to maximize the light input to aperture 24, usually between one and two focal lengths, from filament 12. Various lenses can be used to reduce the spherical aberration commonly experienced with condensing lenses (and thereby allow the use of a smaller entrance aperture 24) such as the use of aspheric lenses or lenses of non-spherical curves, e.g., a hyperbolic plano-convex lens or the use of paired condensers such as a pair of double-convex lenses.

The condensed beam of light 19 is directed to the inlet aperture 24 of the conical light pipe 20. This light pipe can be formed as previously described with internal walls which produce substantially complete internal reflection of the light beam. The entrance loss from reflection at a plane surface at the aperture 24 of the light pipe 20 can be substantially reduced by entrance shield 21 which can be a hollow extension of the conical shape of the light pipe 20. The internal walls of the entrance shield 21 are provided with a very high degree of internal reflection to reduce losses and to achieve a high light efficiency.

Light pipe 20 is preferably formed with the aforementioned glass or transparent plastics. In the illustrated embodiment of FIGS. 2 and 3, light pipe 20 comprises a plurality of optical ribbons 21 which can be of solid form construction or can be a composite of a plurality of individual optical fibers. In the light pipe 20 the ribbons 21 have the desirable conical angle as indicated by the conical walls in FIGS. 2 and 3. Alternatively, light pipe 20 can be of solid construction with the optical ribbons 21 cemented to its exit face.

The optical ribbons 21 also define a light bifurcation means 23 and, to this end, ribbons 21 are flared outwardly as illustrated in FIG. 2 and are butted against transparent windows 52 in the face 54 of prism 50. The inclined face 54 of prism 50 has alternate windows 52 and silvered or mirrored surfaces 56 therebetween to permit transmission of light received from the optical ribbons 21 to the objective lens 60. Lens 60 directs the transmitted light beam onto the imaging member 31 which, in the preferred embodiment, is a solid state cyclic imaging member commonly referred to as a Ruticon, described in greater detail hereinafter. Briefly, the Ruticon stores electromagnetic radiant information in the form of surface deformations of mirror surface 34 in response to incident light imaged on its rear surface 36. This results in reflection and diffraction of the light beam from prism 50. The zero order reflected light, i.e., light entirely reflected from the planar, undeformed regions of surface 34 is directed through the windows 52 of the inclined face 54 of prism 50 which thereby function as light stop means for the zero order reflected light. The higher order diffracted light is directed as shown by lines 35 to the mirrored slots of inclined face 54 and reflection from the prism for ultimate projection onto a visible display means such as a screen or a photoreceptive surface such as a drum of a xerographic device.

Figure 4:
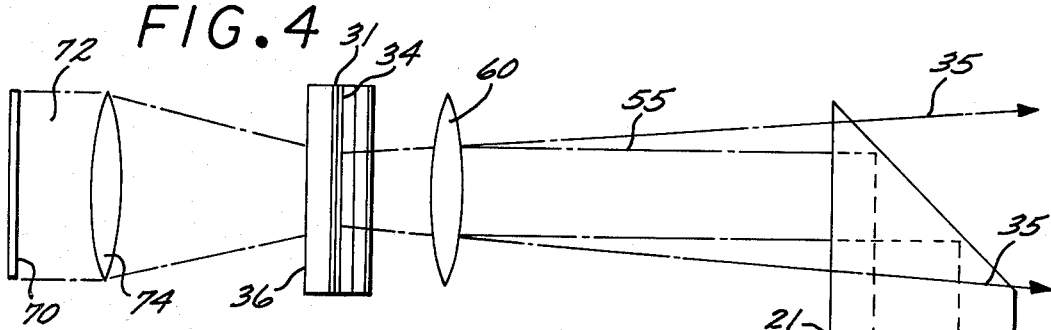
FIGS. 4 and 5 are plan and elevation views of another embodiment of the invention with a Ruticon imaging device.
Figure 5:
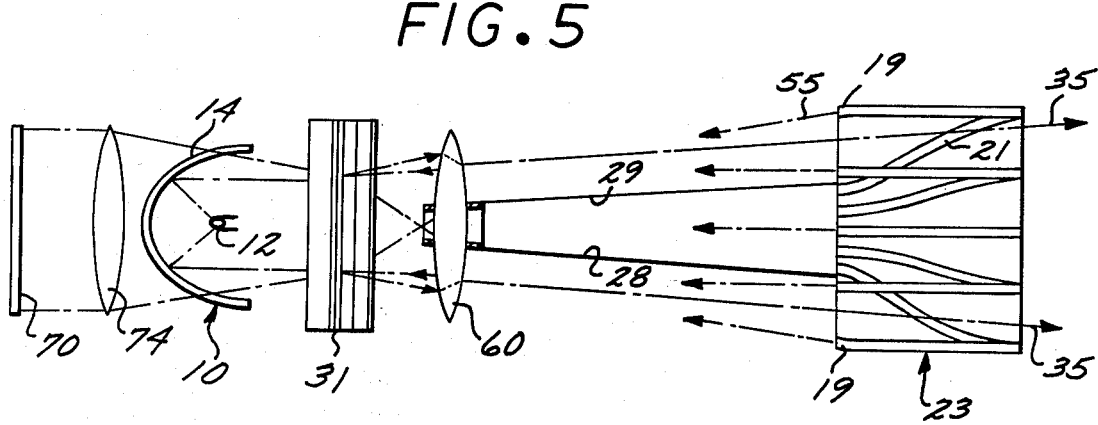

Referring now to FIGS. 4 and 5, another application of the invention will be described. In this application designed to conserve space, use is made of the capability of optical fibers to bend light beams by total internal reflection. In the illustrated embodiment, the light source 10 is as previously described with filament 12 and reflector 14 for generation of a light beam 16 of nonuniform intensity. The light beam is passed through a suitable condensing lens system 18 such as previously described and is directed therefrom into the truncated, conical, hollow entrance 24 to light pipe 20.

Light pipe 20 may be formed with a plurality of optical ribbons generally indicated at 21. If so, the portions of the optical ribbons within the conical light pipe region 20 are formed in a conical manner with tapered sidewalls 25 and 27 and 28 and 29 as shown in FIGS. 4 and 5. The preferred construction of optical ribbons 21 is a solid glass or plastic structure butted to the exit aperture of the tapered light pipe 20, which is also of solid glass or plastic structure.

Advantage is taken of the total internal reflection characteristic of the optical fibers which define the optical ribbons 21 by folding the ribbons with a 45° angle bend 62 to achieve a right angle deflection of the beam. Depending on the degree of collimation of the beam achieved by this time it may be necessary instead to coat the surfaces inclined at 45° with respect to the light pipe exit with a mirror surface, such as aluminum. Referring now to FIG. 5, the optical ribbons 21 are shown with a light bifrucation section 23 in which the ribbons 21 are deflected into spaced-apart positions to provide a plurality of spaced-apart light beams 55 which are directed towards the objective lens 60. The discharge ends 19 of the optical ribbons 21 are preferably bent slightly inward at an angle of from 3° to about 10° to direct the exiting light beams 55 towards the objective lens 60 and thereby reduce exit losses. The objective lens 60 focuses the light beams 55 onto the image-deformed, reflecting surface 34 of Ruticon 31. The rear surface 36 of the Ruticon device receives imaging information from image 70 which is illuminated sufficiently to provide a reflected or transmitted light beam 72 that is passed through lens means 74 to focus onto the rear surface 36 of the Ruticon 31.

The incident image information on surface 36 is of sufficient intensity to allow imagewise deformation of the mirror surface 34 and provide reflected and diffracted light. The reflected light of zero order which occurs at regions of the mirror surface having no deformation is reflected back into the light supply system while diffracted light from sinusoidally deformed areas of the mirror surface, is projected as light beams 35 through the open spaces of the spaced-apart array of ribbons 21 and unto a distal optical readout system such as a screen 50 or drum of a xerography apparatus.

Figure 6:
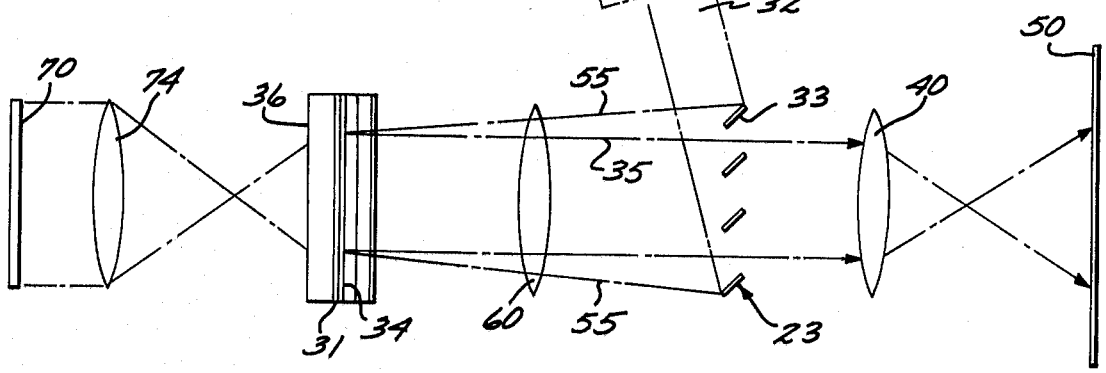
FIG. 6 illustrates a quasi-Schlieren projection system for use with a Ruticon device.
Figure 7:
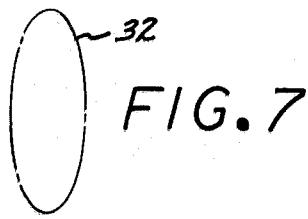
FIGS. 7 and 8 illustrate the application of the invention as an improvement on the projection system of FIG. 6.

The invention can also be applied to the quasi-Schlieren system generally illustrated in FIGS. 6 and 7 for Ruticon image projection. The application of the invention to the system shown in FIGS. 6 and 7 is illustrated and described with regard to FIG. 8. Briefly, the Ruticon projection system illustrated in FIGS. 6 and 7 employs a quasipoint light generation means generally indicated at 10. The light is collimated by condenser lens means 18 which can be an anamorphic lens to produce a beam of collimated light 32 having the cross sectional area illustrated in FIG. 7. Light beam 32 is directed onto a light bifrucation means 23 which comprises a plurality of spaced-apart and parallel reflective surfaces such as louvered mirrors 33 which reflect the incident light as a series of parallel bands 55 onto the objective lens means 60 which focuses the light beams onto the mirror surface 34 of the Ruticon 31. Ruticon 31 receives an image on its rear surface 36 from object 70 with the aid of focusing lens means 74. As previously mentioned, Ruticon 31 is a solid-state, cyclic imaging member having a deformable mirror surface 34 responsive to imaged information to provide reflected light at regions of no incident light on surface 36 and diffracted light in response to imagining electromagnetic radiation received on rear surface 36. The diffracted light, shown as 35, is passed through the open spaces between mirrors 33 and unto a projection lens assembly 40 where the image-modulated light beam is projected onto a distant vusual read-out means such as screen 50 or a drum of xerography apparatus.

Figure 8:
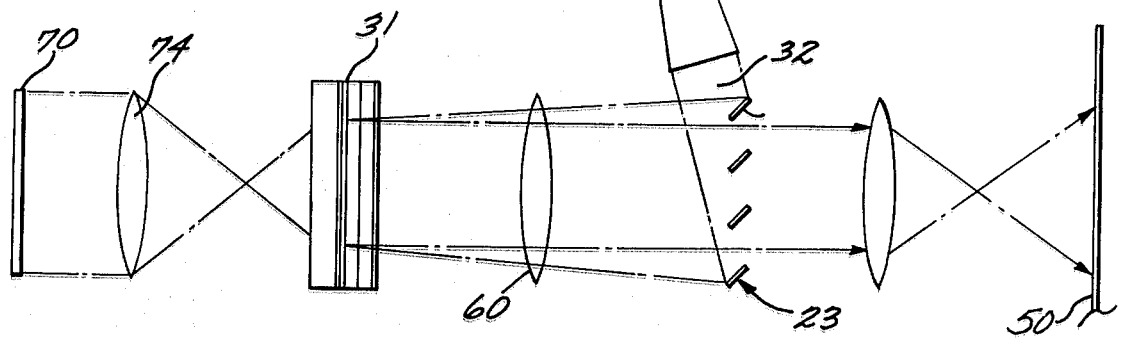

The invention is applied to the aforedescribed Ruticon image projection system by the positioning of light pipe 20 between the light source 10 and the bifrucation means 23. This is illustrated in FIG. 8 wherein the nonpoint light source 10 having filament 12 and reflector 14, as previously described is employed to direct a beam of light unto condensing lens means 18. The condensing lens means is operative to direct light into the inlet aperture of light pipe 20. The light pipe 20 is conical in configuration and, as previously described, can be solid-form of a single, integral transparent member or can be formed as a composite of a plurality of small diameter optical fibers, the former being preferred.

The effect of the light pipe 20 is to increase the random diffusion of the light beam and thereby eliminate any nonuniformity in intensity. The light pipe 20 increases the degree of collimation of the light so that a more useful portion of the light beam 32 is discharged from the light pipe 20 unto the mirrored surfaces 33. The remainder of the optics is similar to that previously described with regard to FIG. 6, however, the intensity of the projected image is substantially enhanced because of the greater light efficiency of light pipe 20.

Figure 9:
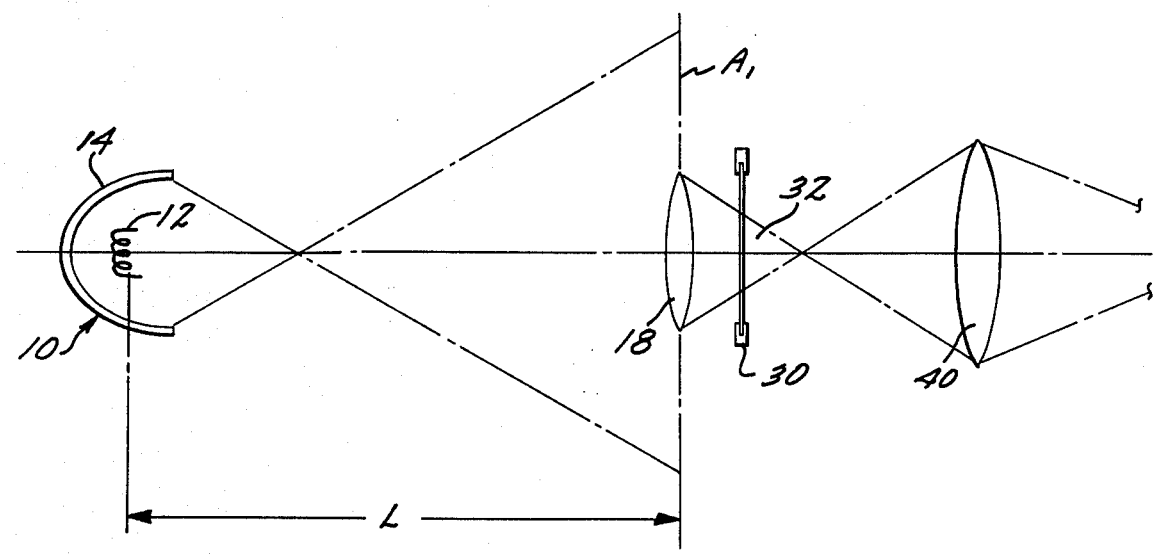
FIG. 9 illustrates a prior art transparency projection system.
Figure 10:
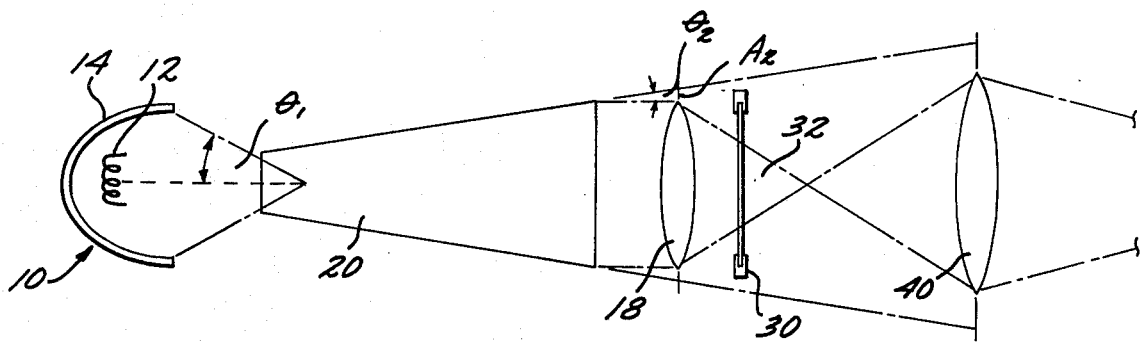
FIG. 10 illustrates the application of the invention to the projection system of FIG. 9.

Referring now to FIG. 9, there is illustrated a conventional transparency image projection system. This system is modified as shown in FIG. 10 to incorporate the invention and provide a comparative basis for the evaluation of the improvements that can be effected through use of the invention. As illustrated, the projection system includes a light source 10 with a filament 12 and an elipsoidal reflector 14 which can have a pebbled, black surface to increase the diffusion of the reflected light. The light is directed from the reflector 14 towards a condensing lens system generally indicated at 18 and comprising a conventional double lens assembly. As shown in FIG. 9, the condensing lens 18 must be located at a distance (L) from the nonpoint filament light source in order to obtain relatively uniform illumination resulting in a substantial loss of the light since the area of condensing lens 18 is only a fraction of the total area, $A_1$, of the light beam arriving at the condensing lens station.

Light which is incident on the condensing lens 18 is directed through transparency 30 having a developed image stored thereon to provide a modulated light beam 32 which is directed unto projecting lens means 40 for focusing on a distant visual readout display such as a reflective screen or a drum of a xerography apparatus.

The invention is applied to the aforedescribed projection system in the manner shown in FIG. 10. Light source 10 with filament 12 and reflector 14 is employed without modification. There is disposed between the condensing lens 18 and the filament 12 of the nonpoint light source 10 a conical light pipe 20 constructed in accordance with this invention. The light pipe 20 is effective, through internal reflections, in achieving a substantial and random diffusion of the light beam so that all nonuniformities in this beam are eliminated. The light pipe 20 also markedly reduces the exit angle $\theta_2$ from the value of the incident angle $\theta_1$, thereby effecting collimation of the light beam. The result is a substantial reduction in the cross sectional area $A_2$ of the light beam at the condensing lens station, thereby insuring an increase in the light which is collected by condenser lens means 18 and passed through the imaging transparency 30 to emerge as the image-modulated beam 32 that is passed to projection lens means 40 for projection onto the distal image display means.

In a typical embodiment light source 10 is a 300 watt tungsten halogen lamp and the ratio of the area of light collected to the total area of the light source, i.e., area of lens 18 to area $A_1$ is 1/13.62, resulting in a very low collection efficiency of this projection system. When the invention is employed with this projection system as illustrated in FIG. 10, the proportion of the light collected by the condensing lens means 18 to the total area $A_2$ of the collimated light beam exiting from light pipe 20 is 1/2.25. Accordingly, the invention can achieve approximately a fivefold increase in intensity of the projection light in image-modulated light beam 32 from that achieved using the conventional system.

The Ruticon is a solid-state cyclic image recording device which is described in greater detail in the article entitled "The Ruticon Family of Erasable Image Recording Devices" by N. K. Sheridon, IEEE Transactions on Electron Devices, ED-19, No. 9, September 1972 pp. 1003-1010, which is incorporated herein by reference. Briefly, the Ruticons are laminated articles comprising a conductive transparent substrate, which can be of glass, polyester or acetate resins which are coated with a thin, transparent layer of tin oxide or metal; a thin photo conductive layer such as a mixture of poly N-vinyl carbozole and a sensitizing dye; a thin deformable elastomer layer such as plasticized polymers, e.g., styrene-butadiene copolymers; and a deformable electrode such as a conductive liquid, conductive gas or thin flexible layer of a metal such as gold or idium. The application of an electrical field between the conductive substrate and deformable electrode imparts to the elastomer the capability of deforming into a surface relief pattern which corresponds to the light intensity distribution of an image focused on the photo conductor. The light, which is modulated by diffraction from the deformed surface, can be gathered and projected onto a visual readout means. The most useful Ruticon device in the imaging projection system described herein is the metal surfaced Ruticon in which a thin reflective layer of metal is coated over the surface of the elastomer. A direct direct current voltage is applied between the substrate and the conductive metal layer which deforms to follow the electric field pattern induced across the elastomer by exposure of the photo conductor to an optical image. The Ruticon thus described can be used directly in the invention or can be employed with a screen such as a Ronchi ruling positioned between the transparent substrate and conductive layer to provide continuous tone image capability.

The invention provides an efficient enabling of the use of Ruticons which is described in my prior U.S. Pat. No. 3,716,359 issued Feb. 13, 1973. In that patent the Ruticons are disclosed as useful to interface between a non-synchronous display and a synchronous copying system. Hence the cathode ray tube output display of an analog or digital computer can be provided with erasable storage of information generated and displayed at irregular time intervals and thereby permitting an orderly and continuous reproduction of the information by xerography or other recording means. The invention permits use of relatively low wattage, nonpoint light sources in such applications because of the greater light efficiency and illumination which it gives to the overall projection system.

What is claimed:

1. An image projecting means including:
   (1) light beam generation means to produce a nonuniform light beam and for projecting said light beam along a projection axis;
   (2) light beam transmission means receiving said nonuniform light beam from said light beam generation means and comprising light pipe means, said light pipe means having internal walls with a high degree of internal reflection and tapered at an angle in the range from 1° to 60° along the projection axis of said light beam, the extent of said light beam transmission means in the direction of said projection axis completely surrounding the projection axis coextensive therewith;
   (3) light beam bifrucation means to divide said light beam into at least two subidvided light beams and including a plurality of optical stops formed thereon, said light beam bifrucation means comprising a plurality of light pipes;
   (4) an imaging member to receive said subdivided light beams and to cause imagewise phase modulation of a portion of said received subdivided light beams, said imaging member being reflective; and
   (5) objective lens means to receive said subdivided light beams and to focus the portion of said nonmodulated sub-divided light beams onto said plurality of optical stops and to focus the modulated portion of said subdivided light beams onto a display surface, said optical steps comprising exit apertures of said light pipes.

2. An image projecting means including:
   (1) light beam generation means comprising:

(a) concave reflector means having a light reflective surface defined by a surface of revolution of a plane curve about a central axis; and
(b) a nonpoint light source position substantially at the focal point of said reflector means, said generation means characterized by the development of a light beam of nonumiform intensity;
(2) condensing lens means;
(3) light beam transmission means receiving said light beam from said condensing lens means and comprising light pipe means with internal walls having a high degree of internal reflection and tapered at an angle in the range from 1° to 60° along the axis of propagation of said light beam, said light pipe means being the only means effecting random diffusion of said light beam by internal reflections, thereby substantially reducing the intensity nonuniformity of said light beam the extent of said light beam transmission means in the direction of said projection axis completely surrounding the projection axis coextensive therewith;
(4) light beam bifrucation/means to receive said light beam from said light beam transmission means and bifrucate said light into a plurality of light beams, said light beam bifrucation means comprising divergent individual light pipes terminating in spaced-apart, parallel alignment at light transmitting windows on the inclined surface of a totally reflecting prism;
(5) an imaging member having a deformable reflective surface for imaging of electromagnetic radiant information; and
(6) objective lens means to focus said plurality of light beams on said reflective surface of said imaging member and for directing zero order reflected light therefrom to said light source and higher order reflected light to visual readout means.

3. The image projecting means of claim 2 wherein said divergent individual light pipes are flat planar sheets folded at about 45° to their longitudinal axis at an intermediate position and terminating with an end beveled at about 45° to provide reversal of the direction of propagation of said parallel light beams.

4. The image projecting means of claim 3 wherein said objective lens means directs zero order reflected light into said light pipes and higher order reflected light between said light pipes to focus on a distant screen.

5. The image projecting means of claim 2 wherein said objective lens means directs said zero order reflected light into said light transmitting windows and higher order reflected light onto the reflecting portions of said totally reflecting prism.

6. The image projecting means of claim 5 including projection lens means to receive said higher order reflected light and focus said light on a remote light receiving means.

7. The image projecting means of claim 5 wherein said reflecting portions of said prism comprises spaced-apart rectangularly shaped mirrors.

8. An image projecting means including:
(1) light beam generation means comprising:
(a) concave reflector means having a light reflective surface defined by a surface of revolution of a plane curve about a central axis; and
(b) a nonpoint light source positioned substantially at the focal point of said reflector means, said generation means characterized by the development of a light beam of nonumiform intensity along a projection axis;
(2) condensing lens means;
(3) light beam transmission means receiving said light beam from said condensing lens means and comprising light pipe means with internal walls having a high degree of internal reflection and tapered at an angle in the range from 1° to 60° along the axis of propagation of said light beam, said light pipe means being the only means effecting random diffusion of said light beam by internal reflections, thereby substantially reducing the intensity nonuniformity of said light beam, the extent of said light beam transmission means in the direction of said projection axis completely surrounding the projection axis coextensive therewith;
(4) light beam bifrucation means to receive said light beam from said light beam transmission means and bifrucate said light into a plurality of light beams, said light bifrucation means comprising a plurality of parallel, spaced-apart, rectangular mirrors at angular orientation to intercept said light beam and direct a plurality of relatively flat beams of light to said lens means;
(5) an imaging member having a deformable reflective surface for imaging of electromagnetic radiant information; and
(6) objective lens means to focus said plurality of light beams on said reflective surface of said imaging member and for directing zero order reflected light therefrom to said light source and higher order reflected light to visual readout means.

* * * * *